(12) United States Patent
Kaneko

(10) Patent No.: US 6,590,187 B1
(45) Date of Patent: Jul. 8, 2003

(54) HIGH-VOLTAGE ELECTRIC FIELD GENERATING SYSTEM AND FRYER THEREWITH

(75) Inventor: Masahiro Kaneko, Osaka (JP)

(73) Assignee: Yugengaisha BioFuture, Musashino (JP)

( * ) Notice: Subject to any disclaimer, the term of this patent is extended or adjusted under 35 U.S.C. 154(b) by 0 days.

(21) Appl. No.: 10/166,398

(22) Filed: Jun. 10, 2002

(30) Foreign Application Priority Data

Jan. 22, 2002 (JP) ........................................ 2002-013494

(51) Int. Cl.[7] ............................ A47J 37/12; A23L 1/025
(52) U.S. Cl. ........................ 219/430; 219/439; 426/237
(58) Field of Search ................................ 219/480, 439; 426/237; 99/403

(56) References Cited

U.S. PATENT DOCUMENTS 6,138,555 A * 10/2000 Hata ........................... 426/237

FOREIGN PATENT DOCUMENTS

| JP | 08215069 | * | 8/1996 |
| JP | 09215609 | * | 8/1997 |
| JP | 11047002 | * | 2/1999 |
| JP | 11-113761 | | 4/1999 |
| JP | 11332753 | * | 12/1999 |
| JP | 2001-161572 | | 6/2001 |

* cited by examiner

Primary Examiner—Joseph Pelham
(74) Attorney, Agent, or Firm—Omori & Yaguchi USA, LLC

(57) ABSTRACT

The present invention relates to a fryer provided with a system that generates a high-density electromagnetic field, preventing deterioration of cooking oil. The fryer comprises: an oil container holding cooking oil; a high-voltage power supply to generate high voltage; and an electrode unit connected to the high-voltage power supply. This electrode unit comprises an electrode made of a screw rod. Because the spiral thread has tips in a shape of acute angle, electric fields tend to concentrate around the acute-angle edges on the entire surface, and thus a high-density electromagnetic field is generated in the oil container.

21 Claims, 8 Drawing Sheets

IV - IV

IX - IX

HIGH-VOLTAGE ELECTRIC FIELD GENERATING SYSTEM AND FRYER THEREWITH

CROSS REFERENCE TO RELATED APPLICATIONS

This application claims priority under 35 U.S.C. 119 based upon Japanese Patent Application Ser. No. 2002-013494, filed on Jan. 22, 2002. The entire disclosure of the aforesaid application is incorporated herein by reference.

BACKGROUND OF THE INVENTION

The present invention relates to a high-voltage electric field generating system and a fryer equipped with the system, wherein a high-voltage electric field is generated in a container to prevent deterioration of oil.

In general, fried-food factories utilize fryers that are fixed at a place. This type of fryer is equipped with a large oil container that can hold and heat cooking oil. Since a large amount of cooking oil deteriorates daily, required is frequent replenishment of oil, which consumes enormous amount of time and labor. Furthermore, certain types of cooking oil are very expensive, causing a cost disadvantage compounded by the needed frequent replenishment. Therefore, it is desirable to have a system that can slow down deterioration of cooking oil.

Kokai Patent Journal No. HEI 11[1999]-113761 disclosed an example of frying device capable of slowing down deterioration of cooking oil. In the disclosed frying device, a plate member with many holes is installed at the bottom of an oil container, and the plate member is used as an electrode for generating a high-voltage electric field. With this type of electrode, electromagnetic fields concentrate around the rims of the aforementioned holes, thus generating a high-voltage electric field. However, a problem is that it is difficult to generate a desired level of high-density electromagnetic fields with the above structure, since the total area of the acute-angle portions is small compared to the entire surface area of the electrode. As a measure to solve this problem, we could increase the plate area of the electrode disclosed in the aforementioned Kokai Patent Journal No. HEI 11[1999]-113761, and make more holes to increase the acute angle portions for generating a desired level of high-density electromagnetic fields. However, with this type of structure, the aforementioned electrode will occupy most of the oil container so that productivity will decrease. To maintain productivity, the fryer must be made large.

BRIEF SUMMARY OF THE INVENTION

The present invention was made in consideration of the situation surrounding the prior art as described above. It is an object of this invention to provide a high-voltage electric field generating system and a fryer therewith in a compact structure, wherein the capacity of an oil container is not taken up too much; a high-voltage electric field is generated efficiently; and fast deterioration of cooking oil can be prevented.

According to the first aspect of this invention, there is provided a fryer, having an oil container to hold oil for frying food; an electrode, having tip portions, installed in the aforementioned oil container; and a high-voltage power supply which is connected to the aforementioned electrode to generate a high-voltage electric field in the oil by creating dense electromagnetic fields around the tip portions. It is preferable that the aforementioned electrode has a plurality of tip portions that are formed adjacent to one another with a predetermined clearance in between. More preferably, the aforementioned electrode is in a shape of a screw rod having one end portion and the other end portion; and the aforementioned tip portions are a screw thread continuously provided with a predetermined pitch.

According to the electrode structure above, it is possible to obtain dense electromagnetic fields around the tip portions in spite of the small area occupied by the electrode. This is due to many pointed tip portions formed on the electrode. Thus, a high-voltage electric field can be generated in the oil, and deterioration of the oil can be effectively prevented.

According to one embodiment of the present invention, the aforementioned high-voltage power supply is connected to one end portion or the other end portion of the electrode which is in a form of a screw rod. When there are a plurality of oil containers, it is preferable that the aforementioned electrode is provided in each oil container; and the electrode in each oil container is connected in series to one end or the other end of the electrode in another oil container. It is preferable also that the aforementioned high-voltage power supply is connected to either one end or the other end of the electrodes connected in series.

According to the configuration above, it will be easy to provide an electrode in each oil container, even in case of a fryer comprising a plurality of oil containers of equal size or various sizes. Also, because it is not necessary to provide a high-voltage power supply for each electrode, the entire construction of the system can be made compact.

According to another one embodiment of the present invention, it is preferable that the aforementioned electrode has an attachment member for installing the electrode to the aforementioned oil container in a manner that it can be easily attached or detached. According to this configuration, since no fastening members such as screws are used, dust such as metal particles are not generated in the oil container. In addition, the electrode may be removed for cleaning or for other purposes, even while the container is full of oil.

Furthermore, in case a food holding member for holding food is provided in the oil container, it is preferable that the aforementioned electrode is installed between the aforementioned food holding member and an inner face of the oil container.

Furthermore, the system may include a holding unit that holds the aforementioned electrode close to, but at a predetermined distance away from, an inner face of the aforementioned oil container. The aforementioned distance should be set to a distance at which no discharge would occur between the tip portions of the aforementioned electrode and the inner face of the oil container.

According to the configuration above, the electrode can be installed on the sidewall of the oil container without having to make the fryer large. In this case, it is possible to prevent discharge since the electrode can be installed at a certain distance away from the inner face of the oil container.

According to the second aspect of the present invention, there is provided a system comprising: an electrode having tip portions, installed in a container that partitions off a space where food is stored or processed; and a high-voltage power supply connected to the aforementioned electrode. When voltage is applied to the electrode by the high-voltage power supply, electromagnetic fields concentrate around the tip portions and a high-voltage electric field is generated in the aforementioned space of the container.

The above configuration provides a high-voltage electric field generating system, which can be used for a device such as a fryer having a container or a space for storing or processing food.

Other features and remarkable effects of the present invention can be more clearly understood by referring to the following specific embodiments and the attached drawings.

DETAILED DESCRIPTION OF THE INVENTION

Preferred embodiments of fryers pertaining to the present invention will be described in detail below with reference to the accompanying drawings.

Figure 1:
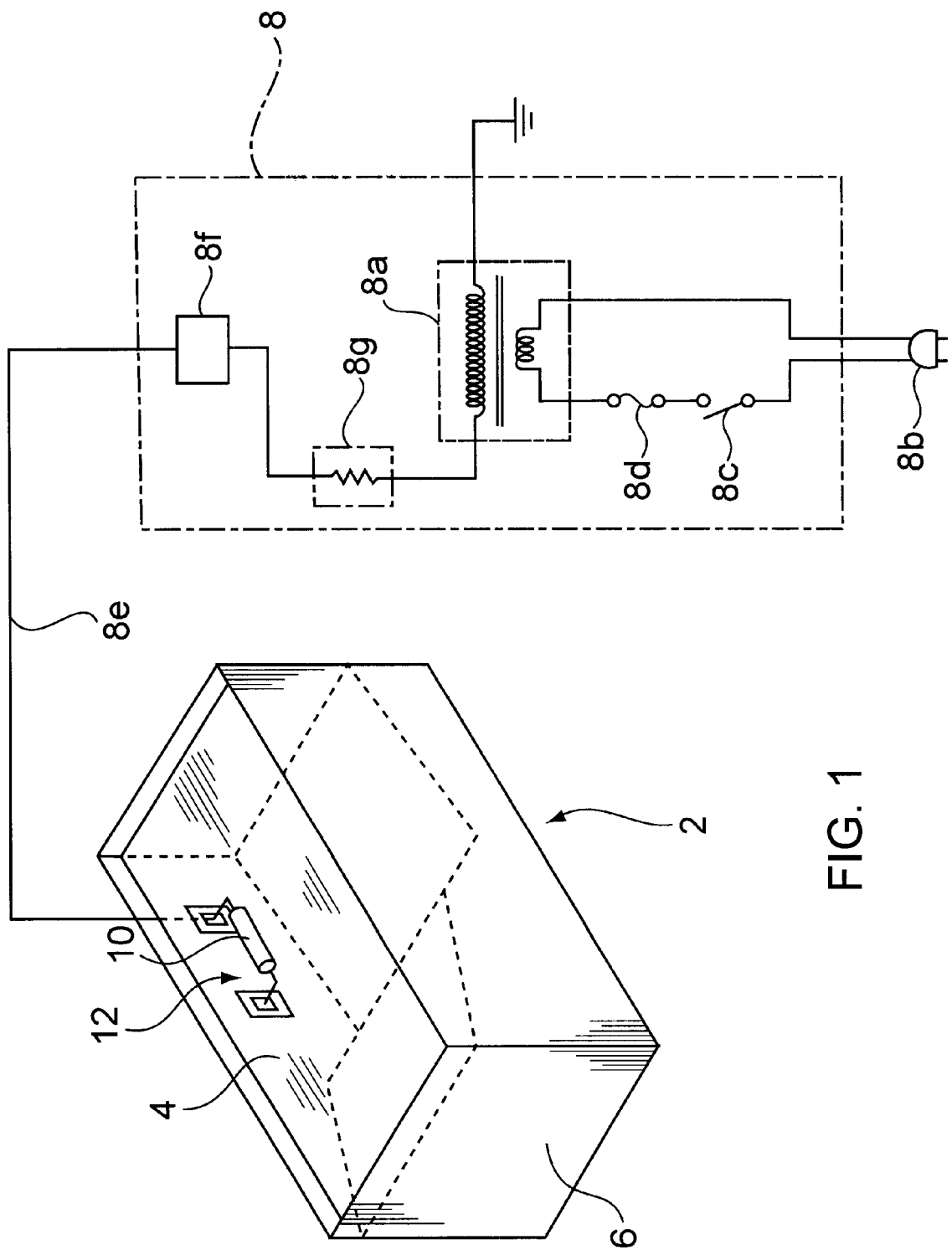
FIG. 1 illustrates a fryer in the first embodiment comprising an electrode to generate a high-voltage electric field in an oil container.

FIG. 1 illustrates a fryer (2) in the first embodiment of the present invention.

The fryer (2) in the present embodiment comprises an oil container (6) to hold cooking oil (4) for frying food; a high-voltage power supply (8) to supply high voltage; and an electrode unit (12) having a screw rod (10) connected to the high-voltage power supply (8).

The oil container (6) is relatively large, and is constructed so as to fry a large quantity of food in a batch. Also, as will be described later, a frying basket may also be installed in the oil container (6) to lift the food out of the oil (4) all at once.

The high-voltage power supply (8) comprises a high-voltage transformer (8a); a power plug (8b) that can be plugged into an outlet to supply commercial AC power to the high-voltage transformer (8a); a power switch (8c) interposed between the plug (8b) and the primary winding of the high-voltage transformer (8a); a fuse (8d); a cable connection unit (8f) that can disconnect a high-voltage cable (8e) from the high-voltage power supply (8); and a high-resistance value resistor (8g) provided between the cable connection unit (8f) and the secondary winding of the high-voltage transformer (8a). The high-voltage cable (8e) connects the high-voltage power supply (8) to the electrode (screw rod 10) of the electrode unit (12)

When the power switch (8c) is turned on, the 100-volt commercial AC enters the high-voltage transformer (8a) through the fuse (8d). The primary voltage is then converted to a high secondary voltage of 1050 volts to 6500 volts by the high-voltage transformer (8a). The high-resistance value resistor (8g) lowers the current. The resultant voltage is then applied to the screw rod (10) of the aforementioned electrode unit (12) through the high-voltage cable (8e).

Figure 2:
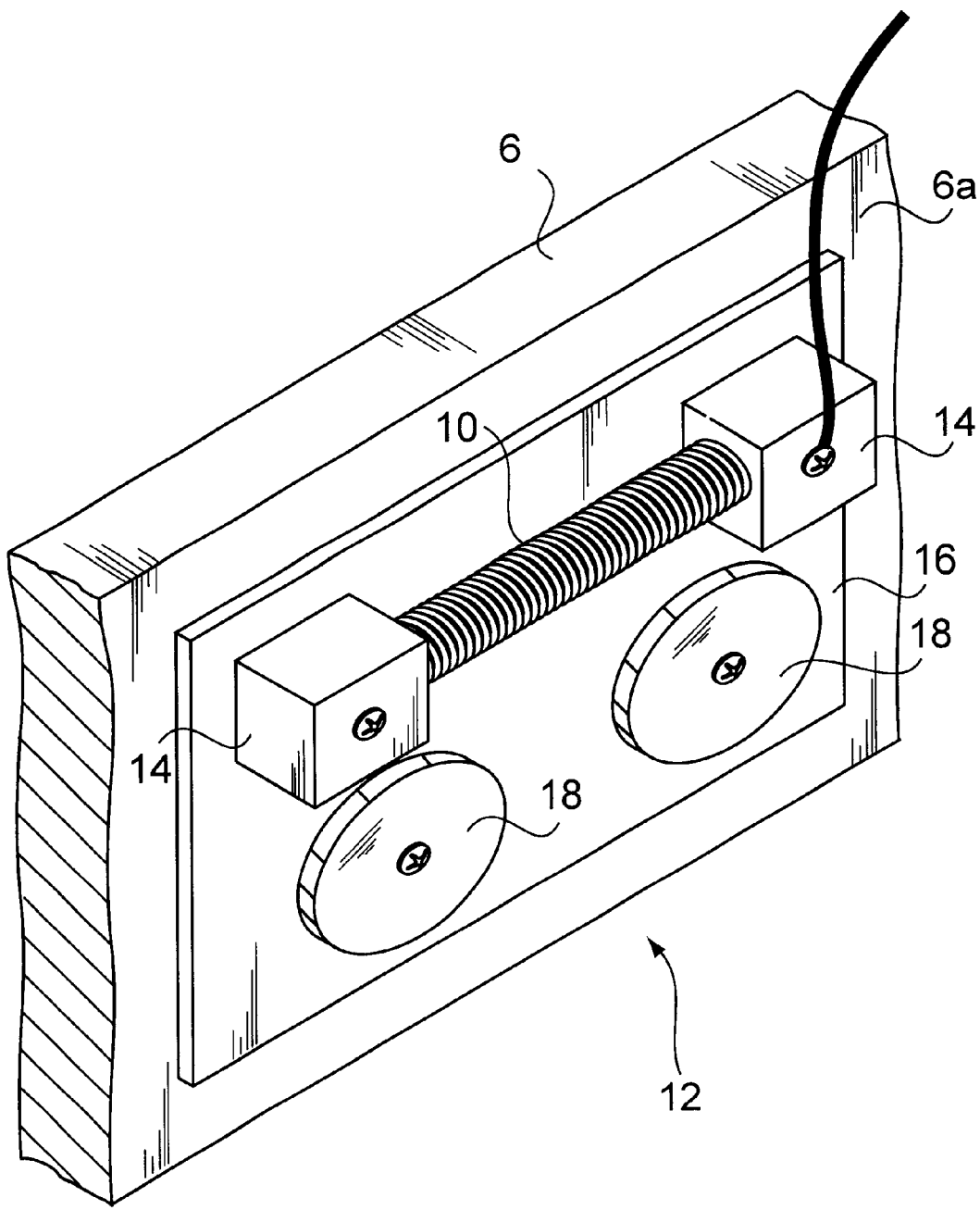
FIG. 2 illustrates an enlarged oblique view of the electrode unit.

The electrode unit (12), for instance, looks like the example illustrated in FIG. 2. It can be installed onto the inner face of the sidewall of the aforementioned oil container (6) in a manner that it can easily be attached or detached. The electrode unit (12) comprises a screw rod (10) that is used as the electrode. This screw rod (10) is attached to a metal plate (16), being held at both ends by a holding member (14) composed of an electrically insulating material such as Teflon. Furthermore, a magnet (18) is installed on the surface of the metal plate (16).

The oil container (6) is made of a metal such as steel to which a magnetic material can be attached, and thus it is capable of attracting the metal plate (16), which has been magnetized by the aforementioned magnet (18). In this manner, the aforementioned electrode unit (12) can be installed on the inner face of the sidewall of the oil container (6) without using fasteners such as screws.

Figure 3:
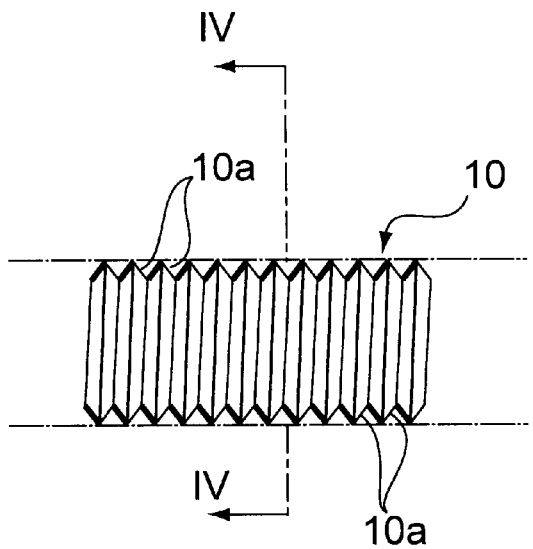
FIG. 3 illustrates an enlarged front view of a part of the electrode.

FIG. 3 illustrates an enlarged view of a portion of the screw rod (10) to which high voltage is applied. On the screw rod (10), a spiral thread (10a) is formed with a predetermined pitch along the longitudinal direction on the entire surface. The spiral thread (10a) is pointed in such a way that the width of each tip portion gets gradually narrower in the radial outward direction, so that electromagnetic fields tend to concentrate around the pointed portion. A high-voltage electric field is thus generated in the oil container (6).

Figure 4:
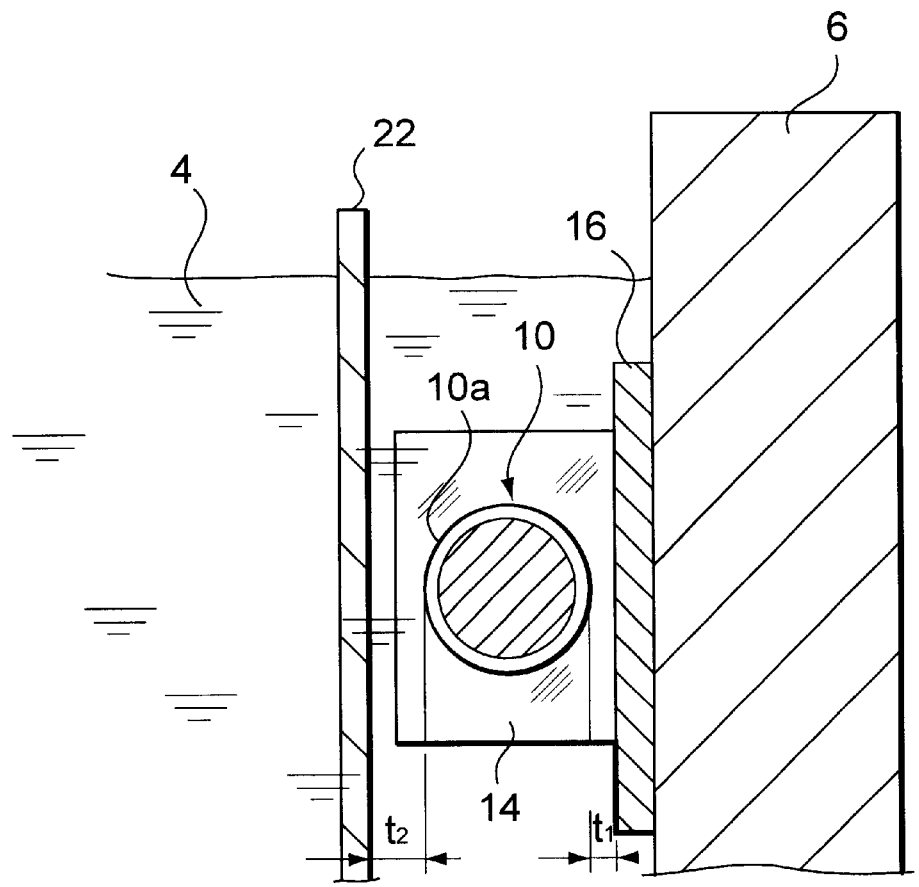
FIG. 4 illustrates a view along the line IV—IV in FIG. 3.

FIG. 4 illustrates a view of the e vertical cross-section of the aforementioned screw rod (10) along the line (IV—IV) in FIG. 3. In this figure, the item (22) indicates a frying basket to hold food. The aforementioned electrode unit (12) needs to be formed as thin as possible so as to provide enough clearance between the basket (22) and the electrode unit (12). In this example, the screw rod (10) is 20 mm thick.

For the present invention to function effectively, electric discharge from the pointed tip portions of the aforementioned thread (10a) of the screw rod (10) must be prevented. Therefore, the electrode unit must be installed away from any conductive members nearby by a predetermine distance or more. In this example, the clearance (t1) between the aforementioned screw rod (10) and the aforementioned metal plate (16) is 2 mm. The clearance (t2) between the screw rod (10) and the aforementioned food holding basket (22) is 7 mm.

According to the above configuration, the tip portions of the thread (10a) of the screw rod (10) can generate a high-voltage electric field in the oil container (6), and thus deterioration of cooking oil can be prevented. This mechanism can be explained as follows. A high-voltage electric field acts to electrolyze water molecules contained in cooking oil, thereby reducing the number of water-molecules. It also acts to instantaneously separate and evaporate water from the oil, thereby promoting water-vaporization. Furthermore, water drops containing impurities such as free fatty acid or emulsified substance are electrically charged and increase their mass, thereby sinking and separating from the cooking oil, which is an insulating material. Consequently, the amount of water dissolved in the cooking oil gets drastically reduced in a high-voltage electric field, and thus deterioration of cooking oil is prevented.

By employing a screw-rod shape for the electrode, pointed tip portions can be easily formed with high density. This leads to cost reduction in manufacturing the fryers (2) equipped with such electrodes.

In addition, since the electrode unit (12) comprising the screw rod (10) can be installed on the inner face of the oil container (6) with enough clearance from the frying basket or the like, the size of the fryer does not have to be large.

Furthermore, since the electrode unit (12) can be attached onto the inner face of the oil container (6) by the magnetic force of the metal plate (16), no fastener members such as screws are used. Consequently, dust or debris such as metal particles are not generated in the oil; and the electrode unit can easily be removed for cleaning or for other purposes even when the container is full of oil.

Next, the second embodiment of the present invention will be described.

Figure 5:
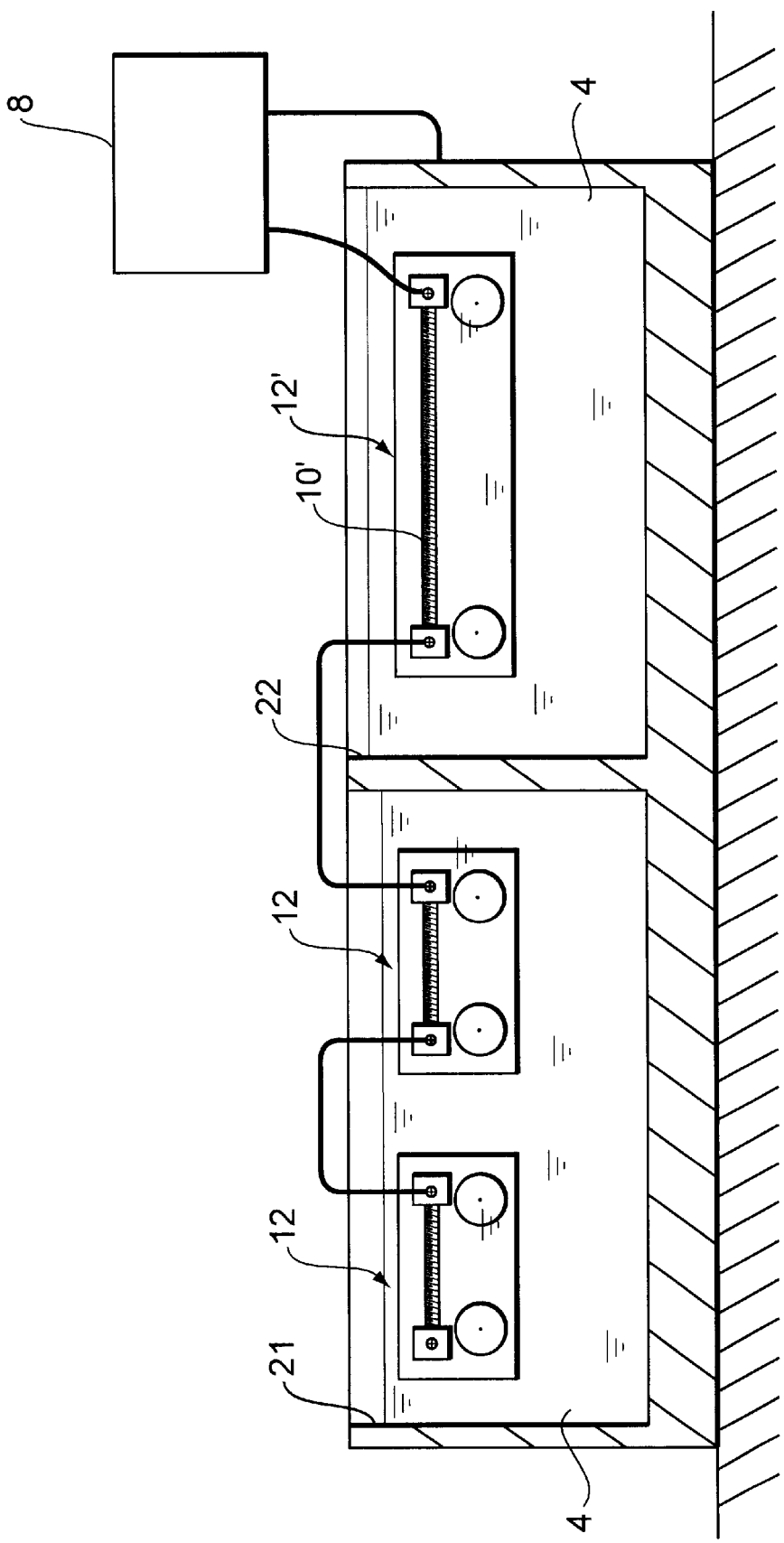
FIG. 5 illustrates a vertical cross-sectional view of a fryer pertaining to the second embodiment.

FIG. 5 illustrates a fryer comprising a plurality of oil containers. In this embodiment, the first oil container is provided with two electrode units (12), both of which are the same as the electrode unit (12) in the first embodiment; and the second oil container is provided with a different electrode unit (12') comprising a screw rod (10') that is longer than the screw rod (10) of the electrode unit (12) in the first embodiment. These electrode units (12) and (12') are connected in series to the aforementioned high-voltage power supply (8).

The electrode unit (12) may be prepared in various sizes as above depending on the size of oil containers. Also, since they can be connected in series, only one high-voltage power supply can be used for more than one electrode units.

Figure 6:
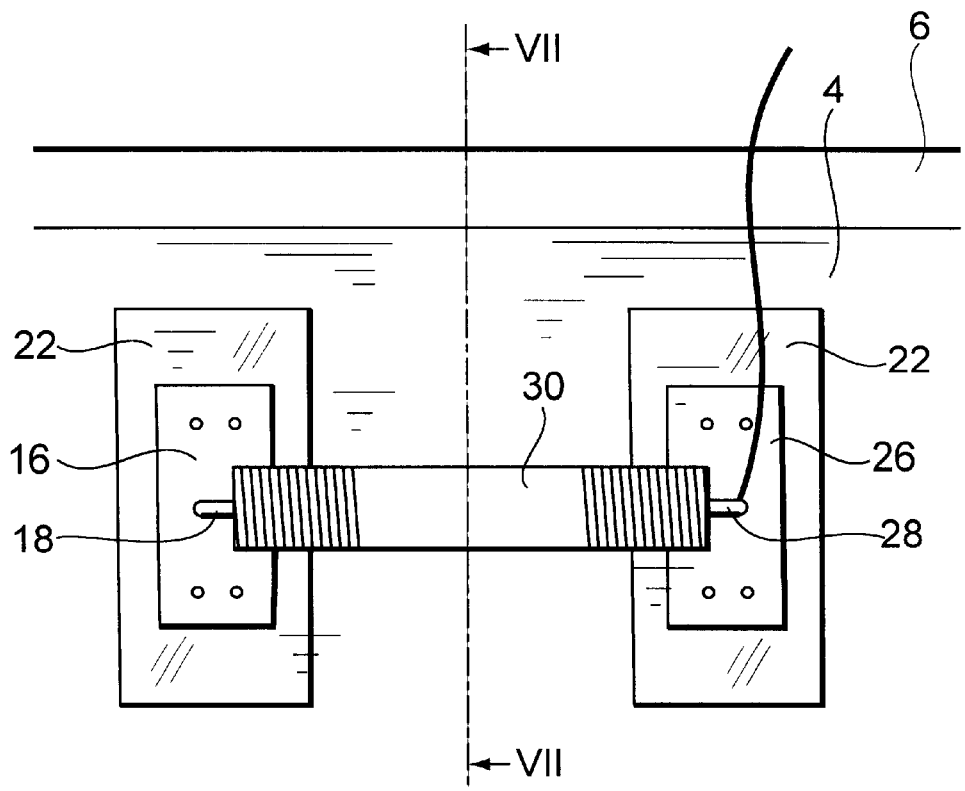
FIG. 6 illustrates a front view of an electrode unit pertaining to the third embodiment.
Figure 7:
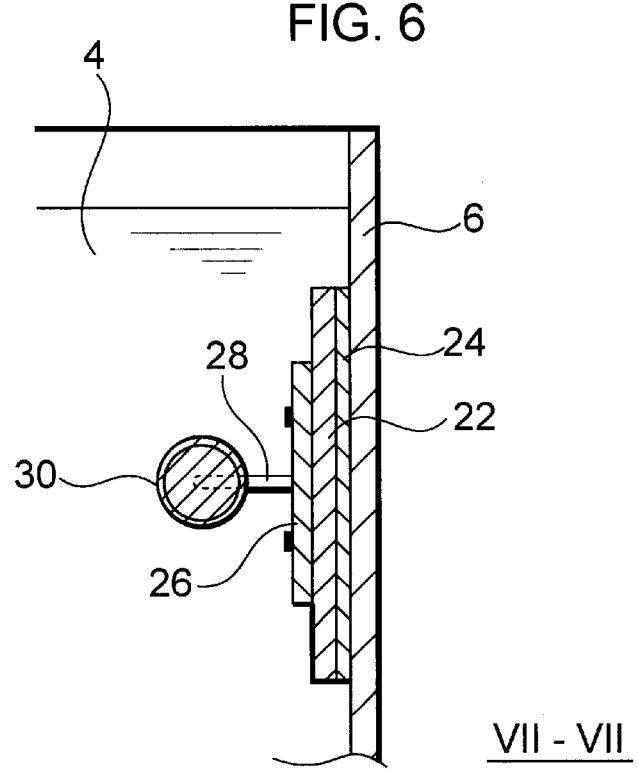
FIG. 7 illustrates a view along the line VI—VI in FIG. 6.

FIG. 6 and FIG. 7 are schematic diagrams illustrating an electrode unit according to the third embodiment.

This electrode unit comprises a pair of electrically insulating substrates (22); magnet plates (24), that are integrated onto the rear face of the electrically insulating substrates (22); seatings (26) attached to the surface of the pair of electrically insulating substrates (22); electrode support rods (28) standing from the seatings (26); and a screw rod (30) with male screw thread formed on the entire surface, which is supported on both ends by the electrode support rods (28).

Figure 8:
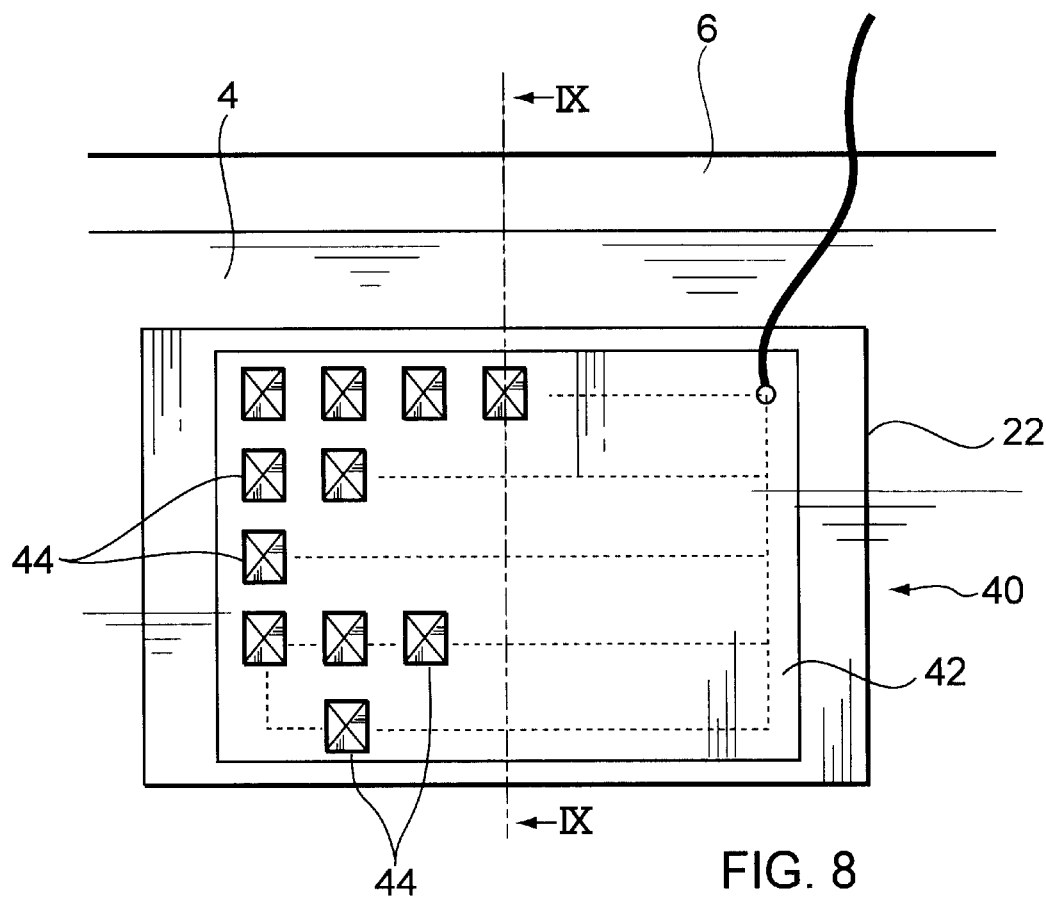
FIG. 8 illustrates a front view of an electrode unit pertaining to the fourth embodiment.
Figure 9:
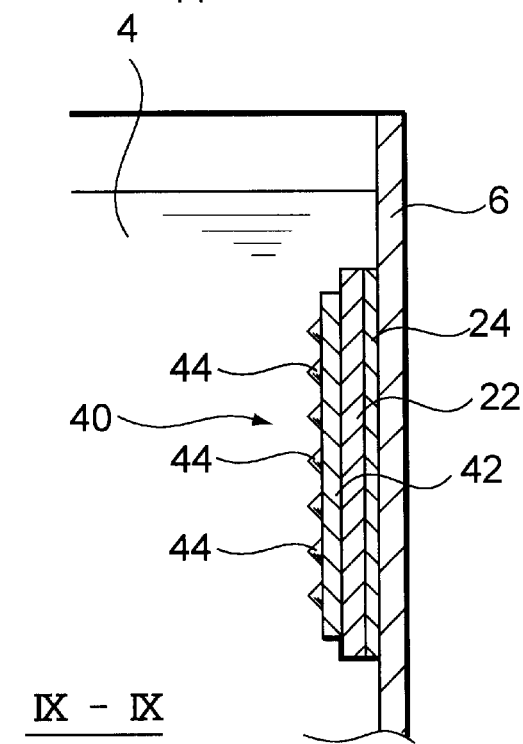
FIG. 9 illustrates a view along the line VIII—VIII in FIG. 8.

FIG. 8 and FIG. 9 are schematic diagrams illustrating an electrode unit according to the fourth embodiment. Parts that are the same as the aforementioned third embodiment are keyed the same, and will not be explained here.

The electrode unit (40) in this embodiment comprises a magnet plate (24), an electrically insulating substrate (22), and an electrode plate (42) integrated with the electrically insulating substrate (22). On the surface of the electrode plate (42), many square-pyramid-shaped protrusions (44) are integrally formed. When high voltage is applied by the high voltage power supply (8) to the electrode unit (40), the electromagnetic fields tend to concentrate around the numerous square-pyramid-shaped protrusions (44), giving rise to a high-voltage electric field in the oil container (6).

Figure 10:
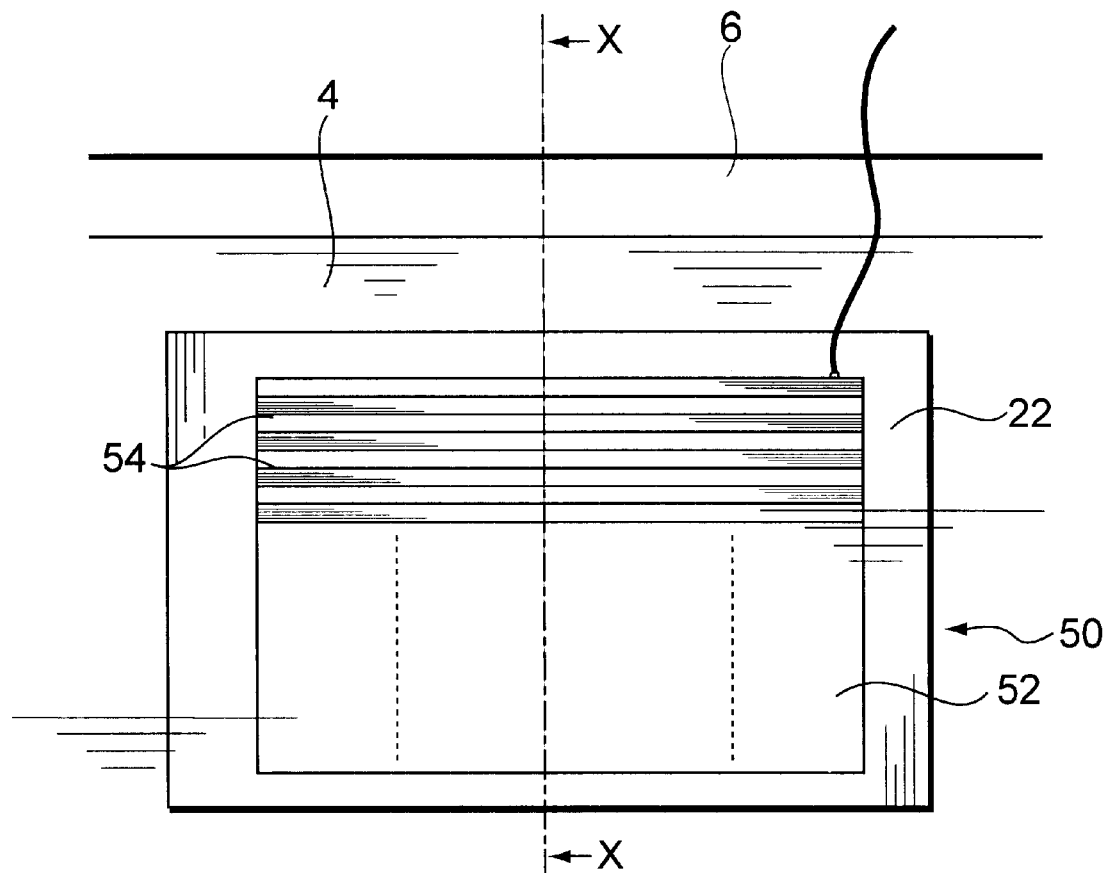
FIG. 10 illustrates a front view of an electrode unit pertaining to the fifth embodiment.
Figure 11:
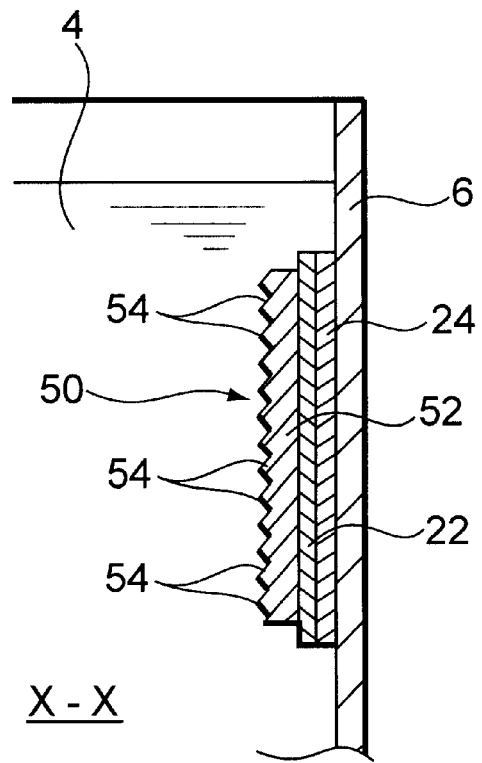
FIG. 11 illustrates a view along the line X—X in FIG. 10.

FIG. 10 and FIG. 11 are schematic diagrams illustrating an electrode unit according to the fifth embodiment.

The electrode unit (50) in this embodiment comprises a magnet plate (24), an electrically insulating substrate (22), and an electrode plate (52) integrated with the electrically insulating substrate (22). On the surface of the electrode plate (52), many protruding stripes (54) with triangular transverse cross-sections are formed in parallel. When high voltage is applied by the high voltage power supply (8) to the electrode unit (50), the electromagnetic fields tend to concentrate around the tips of the numerous protruding stripes (54), giving rise to a high-voltage electric field in the oil container (6).

Figure 12:
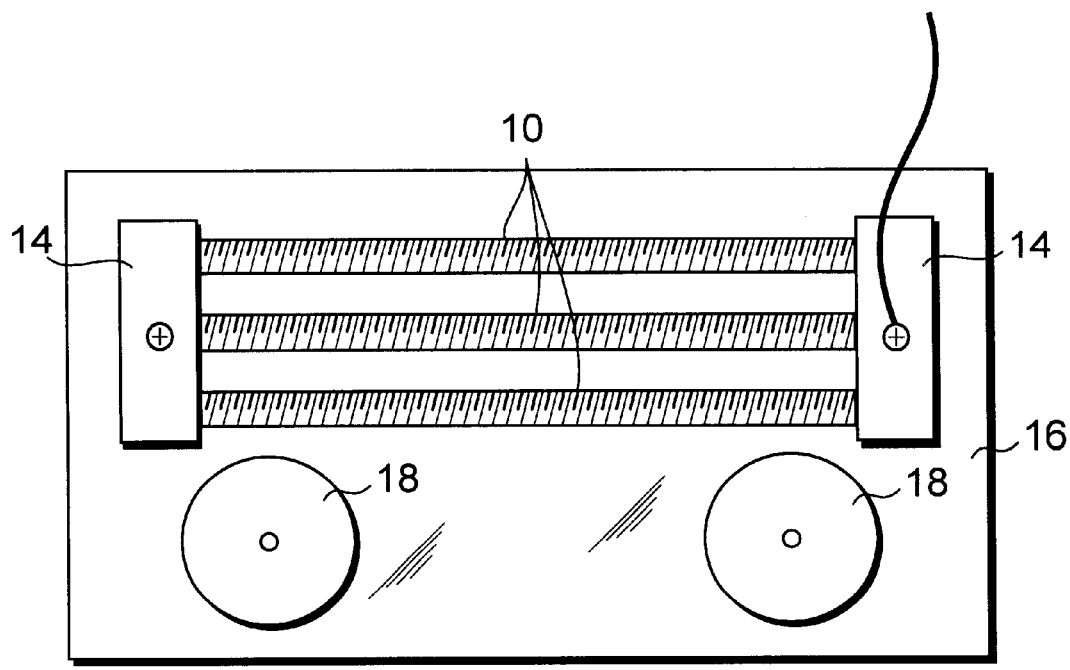
FIG. 12 illustrates a front view of an electrode unit pertaining to the sixth embodiment.

FIG. 12 is a front view of an electrode unit according to the sixth embodiment.

The electrode unit in this embodiment comprises a plurality of aforementioned screw-rod-shaped electrodes (10), which are connected in parallel at one end portions or the other end portions. The high-voltage power supply (8) is connected to a place where all the end portions of the electrodes are connected. This structure offers more surface area of the electrodes (10), and thus generating an electric field with a higher voltage than the case of one electrode.

Figure 13:
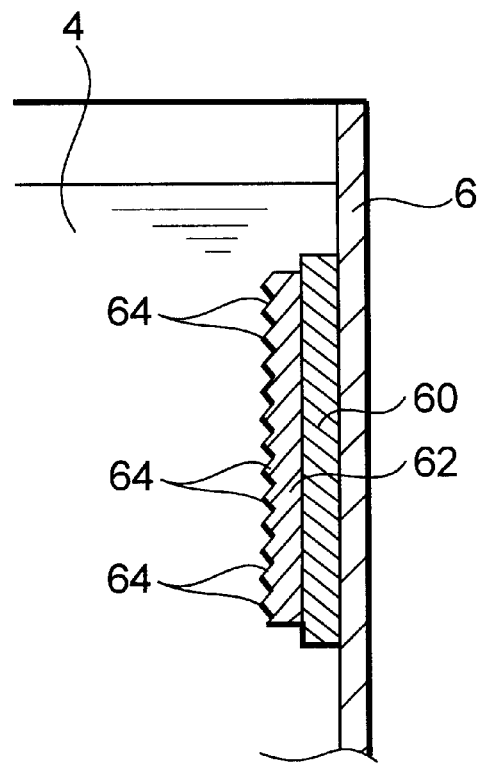
FIG. 13 illustrates a side view of an electrode unit pertaining to the seventh embodiment.

FIG. 13 is a side view of an electrode unit according to the seventh embodiment.

The electrode unit in this embodiment comprises an attachment plate (60) made of an electrically insulating magnet such as ferrite. The plate (60) acts to attach to an inner side of the oil container (6) by a magnetic force, as well as to provide an electrical insulation. In this embodiment, one side of the attachment plate (60) is integrated with the electrode (62) having many protruding stripes (64). The thickness of the attachment plate (60) must be predetermined so as to prevent discharge between the electrode (62) and the inner face of the oil container (6).

Obviously, many modifications and variations of the present invention are possible in light of the above teachings. For instance, the application of the aforementioned electrode unit is not limited to fryers. It may be provided, for instance, in a food storage refrigerator, among others. In such a case also, the invention can effectively prevent deterioration of food. It is therefore to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. A fryer comprising:
   an oil holding member for holding oil to fry food;
   an electrode installed in said oil holding member, said electrode having a tip portion; and
   a high-voltage power supply connected to said electrode for applying high voltage so as to produce electromagnetic fields concentrated around said tip portion of said electrode, thereby generating a high-voltage electric field in oil held in said oil holding member.

2. The fryer according to claim 1, wherein
   said electrode comprises a plurality of tip portions, which are provided adjacent to one another being apart from one another by a predetermined distance.

3. The fryer according to claim 2,
   wherein said electrode is a screw-rod shaped electrode having one end portion and the other end portion along a longitudinal direction, and
   wherein said tip portion is a screw thread continuously provided on the screw-rod shaped electrode with a predetermined pitch between the one end portion and the other end portion.

4. The fryer according to claim 3, wherein
   said high-voltage power supply is connected to one end portion or the other end portion of said screw-rod-shaped electrode.

5. The fryer according to claim 3, wherein
said oil holding member comprises a plurality of oil containers, each of said oil containers being provided with said electrode; and
said electrode in each oil container is connected in series to the electrode in another oil container at one end portion or at the other end portion of the electrode.

6. The fryer according to claim 5, wherein
said high-voltage power supply is connected to one end portion or the other end portion of said plurality of electrodes connected in series.

7. The fryer according to claim 3, wherein
said electrode comprises a plurality of said screw-rod-shaped electrodes connected in parallel at one end portions or the other end portions.

8. The fryer according to claim 1, wherein
said electrode is provided with an attachment member for detachably attaching the electrode to an inner face of said oil holding member.

9. The fryer according to claim 8, wherein
said attachment member is a magnetized plate which can be detachably attached to an inner face of said oil holding member by a magnetic force.

10. The fryer according to claim 1, further comprising:
a food holding member to hold food, being provided in said oil holding member, wherein
said electrode is installed between said food holding member and an inner face of said oil holding member.

11. The fryer according to claim 1, further comprising:
a holding unit, which holds said electrode near an inner face of said oil holding member and being apart from the inner face by a predetermined distance, wherein
said distance is set to a distance at which no discharge would occur between the tip portion of said electrode and the inner face of said oil holding member.

12. A high-voltage electric field generating system comprising:
an electrode having a tip portion, said electrode being installed in a container that has a space for storing or processing food; and
a high-voltage power supply connected to said electrode for applying high voltage so as to produce electromagnetic fields concentrated around said tip portion of said electrode, thereby generating a high-voltage electric field in said space in said container.

13. The high-voltage electric field generating system according to claim 12, wherein
said electrode comprises a plurality of tip portions, which are provided adjacent to one another being apart from one another by a predetermined distance.

14. The high-voltage electric field generating system according to claim 13, wherein
said electrode is a screw-rod shaped electrode having one end portion and the other end portion along a longitudinal direction, and
said tip portion is a screw thread continuously provided on the screw-rod shaped electrode with a predetermined pitch between the one end portion and the other end portion.

15. The high-voltage electric field generating system according to claim 14, wherein
said high-voltage power supply is connected to one end portion or the other end portion of said screw-rod-shaped electrode.

16. The high-voltage electric field generating system according to claim 14, wherein
said electrode comprises a plurality of said screw-rod-shaped electrodes connected in series.

17. The high-voltage electric field generating system according to claim 16, wherein
said high-voltage power supply is connected to one end portion or the other end portion of said plurality of screw-rod-shaped electrodes connected in series.

18. The high-voltage electric field generating system according to claim 14, wherein
said electrode comprises a plurality of said screw-rod-shaped electrodes connected in parallel at one end portions or the other end portions.

19. The high-voltage electric field generating system according to claim 13, wherein
said electrode is provided with an attachment member for detachably attaching the electrode to an inner face of said container.

20. The high-voltage electric field generating system according to claim 19, wherein
said attachment member is a magnetized plate which can be detachably attached to an inner face of said container by a magnetic force.

21. The high-voltage electric field generating system according to claim 12, further comprising:
a holding unit, which holds said electrode near an inner face of said container but being apart from the inner face by a predetermined distance, wherein
said distance is set to a distance at which no discharge would occur between the tip portions of said electrode and the inner face of said container.

* * * * *